(12) United States Patent
Reeb et al.

(10) Patent No.: US 6,758,071 B1
(45) Date of Patent: *Jul. 6, 2004

(54) AUTOMOBILE ANTI-THEFT SYSTEM

(76) Inventors: Rex Reeb, P.O. Box 324, Gilbert, AZ (US) 85299; Colin G. O'Hair, 2623 W. Ironstone Ave., Apache Junction, AZ (US) 85220

( * ) Notice: Subject to any disclaimer, the term of this patent is extended or adjusted under 35 U.S.C. 154(b) by 0 days.

This patent is subject to a terminal disclaimer.

(21) Appl. No.: 10/315,828

(22) Filed: Dec. 9, 2002

Related U.S. Application Data

(63) Continuation-in-part of application No. 09/773,084, filed on Jan. 31, 2001, now Pat. No. 6,499,324.

(51) Int. Cl.⁷ .............................................. F16H 57/00
(52) U.S. Cl. ........................... 70/201; 70/181; 70/256; 70/237
(58) Field of Search ...................... 70/201, 202, 237, 70/181, 192, 256; 180/287; 464/36; 192/56.62

(56) References Cited

U.S. PATENT DOCUMENTS

| | | | |
|---|---|---|---|
| 1,676,623 A | 7/1928 | Turner | 70/256 |
| 1,764,383 A | 6/1930 | Bezek | 70/202 X |
| 1,770,801 A | 7/1930 | Perrelly | 70/202 |
| 2,544,809 A * | 3/1951 | Stanley | 192/56.62 |
| 2,765,648 A | 10/1956 | Hatcher | 70/264 |
| 2,931,207 A | 4/1960 | Fisher | 70/187 |
| 2,933,916 A | 4/1960 | Dean | 70/192 |
| 3,470,974 A | 10/1969 | Pefine | 180/114 |
| 3,631,694 A | 1/1972 | Teroux | 70/202 |
| 3,754,412 A * | 8/1973 | Briggs | 192/56.62 X |
| 3,898,817 A * | 8/1975 | Capewell et al. | 464/36 X |
| 4,076,095 A | 2/1978 | Adamski | 70/202 X |
| 4,263,996 A * | 4/1981 | Putney | 192/56.62 |
| 4,333,326 A | 6/1982 | Winters | 70/203 |
| 4,548,305 A * | 10/1985 | Anderson | 192/56.62 |
| 4,566,556 A | 1/1986 | Wodeslavsky | 70/237 X |
| 4,732,018 A | 3/1988 | Crosby | 70/19 |
| D312,200 S | 11/1990 | Bhagwat | D8/333 |
| 5,040,387 A | 8/1991 | Knott | 70/202 |
| 5,263,345 A | 11/1993 | Zagorac | 70/201 |
| 5,359,868 A | 11/1994 | Villani | 70/203 |
| 5,363,270 A | 11/1994 | Wahba | 361/155 |
| 5,379,619 A | 1/1995 | Young | 70/202 |
| 5,482,136 A | 1/1996 | Sorkin | 180/287 |
| 5,586,457 A | 12/1996 | Keener | 70/201 |
| 5,842,364 A | 12/1998 | Oliver | 70/202 |
| 5,857,913 A * | 1/1999 | Fujimura et al. | 464/36 |
| 5,896,968 A * | 4/1999 | Bruntz | 464/36 X |
| 5,950,463 A | 9/1999 | Glazier | 70/202 |
| 6,019,708 A * | 2/2000 | Kaminski et al. | 464/36 |
| 6,029,483 A | 2/2000 | Daniels | 70/199 |
| 6,132,435 A * | 10/2000 | Young | 464/36 X |
| 6,186,297 B1 * | 2/2001 | Breckenridge | 192/52.62 X |
| 6,206,784 B1 * | 3/2001 | Kato | 464/36 |
| 6,312,339 B1 * | 11/2001 | Beyert | 464/36 X |
| 6,499,324 B2 * | 12/2002 | Reeb et al. | 70/201 |

* cited by examiner

*Primary Examiner*—Suzanne Dino Barrett
(74) *Attorney, Agent, or Firm*—Schmeiser Olsen & Watts, LLP

(57) ABSTRACT

An automobile anti-theft device comprises a decoupling assembly having a first decoupling portion that couples to an accelerator system and a second decoupling portion that couples to a throttle system. The first decoupling portion and the second decoupling portion are removably rotatingly coupled together. The first decoupling portion comprises a first decoupling disc having a locking pin aperture. A locking pin assembly is configured to removably couple with the first decoupling portion. The locking pin assembly comprises a locking pin removably extendable into the locking pin aperture, such that when the locking pin is not extended into the locking pin aperture the accelerator system may operate the throttle system and the automobile's engine can rev above idle, and when the locking pin is extended into the locking pin aperture the accelerator system is prevented from operating the throttle system and the automobile's engine cannot rev above idle.

19 Claims, 10 Drawing Sheets

US 6,758,071 B1

AUTOMOBILE ANTI-THEFT SYSTEM

CROSS REFERENCE TO RELATED APPLICATIONS

This application is a continuation-in-part of the earlier patent application entitled "AUTOMOBILE ANTI-THEFT SYSTEM," Ser. No. 09/773,084, filed Jan. 31, 2001 now U.S. Pat. No. 6,499,324, now pending, the disclosure of which is hereby incorporated herein by reference.

BACKGROUND OF THE INVENTION

1. Technical Field

This invention generally relates to an anti-theft system for uncoupling an automobile's throttle system from its accelerator system using a remote switching device while maintaining a normal feel to the accelerator pedal.

2. Background of the Invention

In the late 1990's an automobile was stolen every 25 seconds in the United States, contributing to a $7.5 billion auto theft business and growing according to the Insurance Information Institute. Anti-theft devices include car alarms, large locks such as "The Club®," GPS tracking devices which keep track of the location of a car, and immobilizing devices that prevent a car from starting for an unauthorized driver.

However, car theft continues to be a significant problem because of the many shortcomings of these conventional anti-theft devices. For example, the sound of car alarms, especially in urban areas, rarely captures the attention of passers-by any more. In addition, padlocks or other small locks on the accelerator, brake or clutch pedals may be easily overcome by pushing hard against the pedals and snapping the locks. Furthermore, large locks may be easily defeated by thieves who carry equally large cutters. Moreover, large automobile locks applied to the steering wheel, brake, clutch, or accelerator may be unwieldy to apply, remove and store. Additionally, although GPS tracking devices may provide round-the-clock monitoring of a vehicle's location, such monitoring may mean a high monthly bill. Besides, some owners are wary of allowing an unknown entity to know the whereabouts of their vehicle round-the-clock. Overall, thieves know that these conventional anti-theft devices may be disconnected, and many of these devices must be disabled or removed by the driver before the car starts moving, leaving the driver defenseless against a carjacker who enters the automobile while it is in operation.

Therefore, there exists a need to provide an effective automobile anti-theft device that is not easily overcome by a thief with big cutters, is effective against carjackers, may be operated with a remote communication system, and retains the feel of a normal operable accelerator pedal even while the device is engaged.

DISCLOSURE OF INVENTION

According to embodiments of the present invention, this invention provides an anti-theft device which reversibly disengages the accelerator system from the throttle system of an automobile. A locking pin is selectively extendable into an aperture in the anti-theft device such that when the locking pin is extended into the aperture, the accelerator system is prevented from actuating the throttle system to cause the engine to rev above idle, and when the locking shaft is not extended into the aperture the accelerator system performs normally.

Embodiments of the present invention may include the following features alone or in combination. The system is easily installed at the factory or after-market because it replaces the factory bushing and accelerator-throttle linkage or the accelerator-drive-by-wire sensor linkage found affixed to the floor of the passenger compartment adjacent the accelerator pedal of many automobiles. The invention is difficult to remove because the working parts are contained in a tamper-resistant box which is affixed to the floor of the passenger compartment by fasteners which are inserted from the engine side of the firewall. To remove the invention from a parked car, a thief would have to spend time underneath the automobile. Because the invention constitutes the linkage between the accelerator system and the throttle system, even if a thief managed to remove the protective tamper-resistant box, cutting through the working parts of the invention would disconnect the accelerator system from the throttle system, rendering the automobile immobile. In addition, the locking device may be engaged and disengaged using a dashboard switch, a remote switching device or integrated paging systems. The invention may be activated even while the automobile is in motion and the accelerator pedal is pressed. When activated while the automobile is in motion, the locking device will not operate to disengage the accelerator system from the throttle system until the driver takes her foot off of the accelerator pedal, to engage the brake, for example. Then, the lock may snap into place so that the driver may not accelerate again. The accelerator pedal may also retain some "give" even when the device is engaged and locked.

The foregoing and other features and advantages of the invention will be apparent to those of ordinary skill in the art from the following more particular description of the invention and the accompanying drawings.

BRIEF DESCRIPTION OF DRAWINGS

The invention will hereinafter be described in conjunction with the appended drawings, where like designations denote like elements.

DETAILED DESCRIPTION OF THE INVENTION

Figure 1:
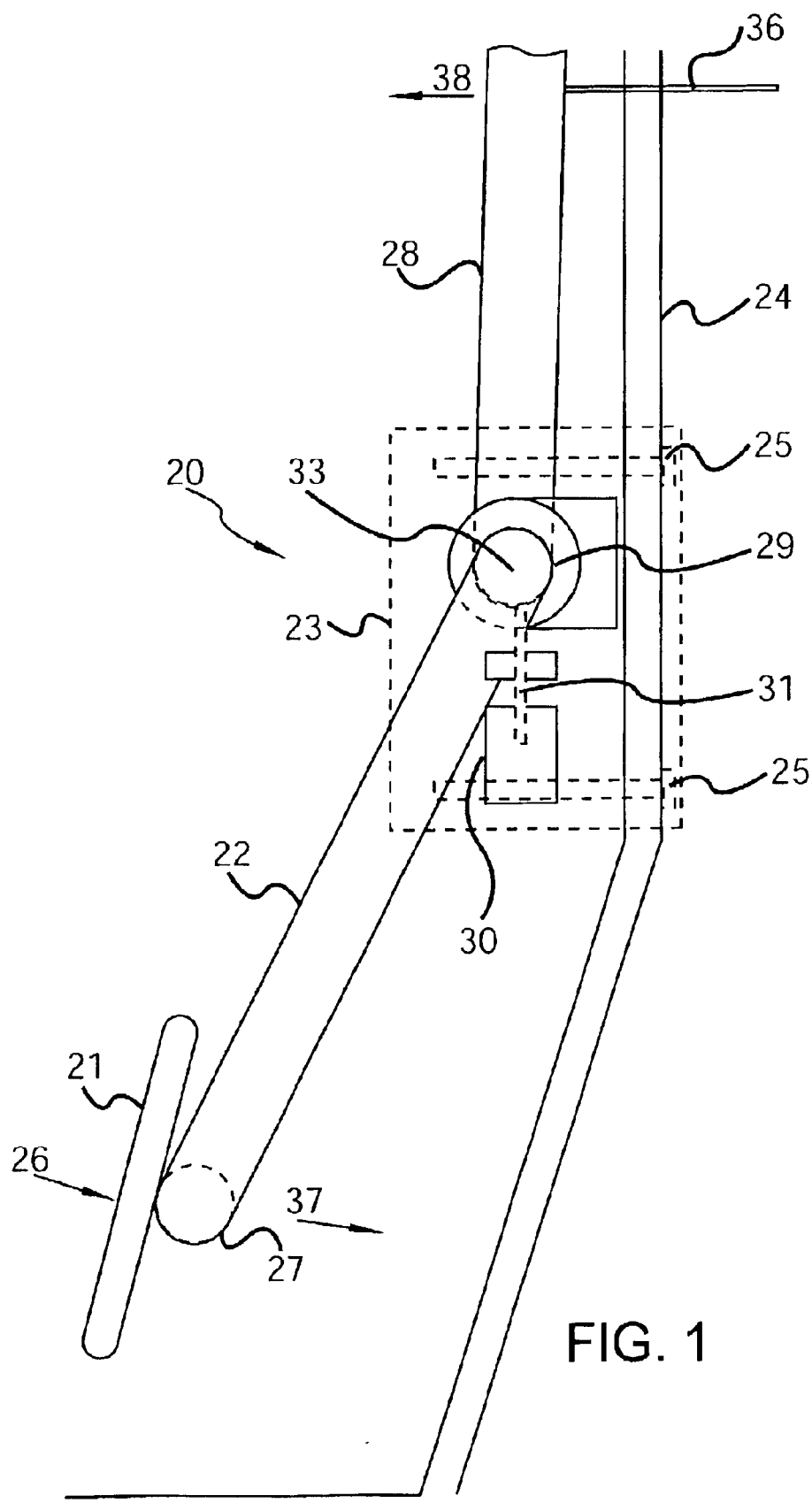
FIG. 1 is a side view of an anti-theft device configured according to an embodiment of the present invention.

It will be understood by those of ordinary skill in the art that the invention is not limited to the specific structures and systems illustrated in the drawings or other components described herein. Although particular accelerator systems, throttle systems, anti-theft devices, bearings, plates, shafts, springs, spacers, recesses, apertures, shoulders, washers, flanges, locking pins, retainers, housings, motors, screws, switches, PLC's, programs, connections, and other components are illustrated in the drawings or described herein, such structures, systems, devices, and components may comprise any shape, size, style, type, model, version, diameter, radius, bore, resiliency, coil configuration and number, gauge, material, and/or the like as is known in the art for such structures, systems, devices, and components consistent with the intended mechanical and/or electrical operation of an anti-theft system of the invention.

Moreover, it will also be understood by those of ordinary skill in the art that the invention is not limited to use of any specific structures, systems, and components provided that the they are selected consistent with the intended mechanical and/or electrical operation of an anti-theft system of the invention. Accordingly, for example, anti-theft device embodiments of the present invention may be used in conjunction with any throttle system, such as a carburetor system, a throttle body system, a fuel injection system, a diesel-type throttle pump system, a drive-by-wire system, and the like. Additionally, anti-theft device embodiments of the present invention may be mounted at any appropriate location to removably disrupt (mechanically and/or electrically) the accelerator-throttle linkage, such as on the engine side of the firewall by security fasteners such as headless screws, tap-through screws, rivets or other similar fastening devices, or directly coupled to the carburetor, the throttle body, the fuel injection system, the diesel-type throttle pump, or the like for example.

Generally, the present invention provides an anti-theft device which reversibly disengages an accelerator system from a throttle system of an automobile. A locking shaft may be selectively extendable into an aperture in the anti-theft device such that when the locking shaft is extended into the aperture, the accelerator system is prevented from actuating the throttle system to cause the engine to rev above idle, and when the locking shaft is not extended into the aperture, the accelerator system performs normally. The locking shaft may be extended into and out of the aperture using a remote communication system.

With reference to FIGS. 1–3 and 5, although the invention may be readily adapted to a variety of embodiments of an automobile anti-theft device, anti-theft device 20 is an example of an automobile anti-theft device of the invention. Describing anti-theft device 20 generally, anti-theft device 20 provides a locking device to reversibly disengage the accelerator system from the throttle system of an automobile. A factory bushing commonly found affixed to the floor of the passenger compartment of an automobile provides a pivot point for a substantially Z-shaped metal bar which transfers motion of the accelerator pedal, through a well-known attachment point, to the throttle inside the engine. In anti-theft device 20, the Z-shaped metal bar may be replaced by an accelerator shaft 22 coupled at one end to the accelerator pedal 21 and at the other end to a main shaft 45. The central axis 33 of main shaft 45 forms the pivot axis of the accelerator-throttle coupling. The main shaft 45 is coupled at one end to the accelerator shaft 22 and at the other end to a throttle shaft 28. Thus, together, accelerator shaft 22, main shaft 45 and throttle shaft 28 form a replacement Z-shaped complex which transfers motion from accelerator pedal 21 to the throttle system to cause the car's engine to rev above idle.

The complex passes through a steel tamper-resistant box 23 through bushings 40. The whole complex is attached to the internal surface of the fire wall by security fasteners such as headless screws, tap-through screws, rivets or other similar fastening devices. Because the present invention may replace the factory bushing, it provides the connection between the accelerator pedal and the throttle system. Cutting through the present invention would serve to sever the connection between the accelerator pedal and the throttle system, rendering the automobile immobile.

FIG. 1 also illustrates that an accelerator pedal 21 may be attached to an accelerator shaft 22 at pedal end 27 of accelerator shaft 22. Accelerator pedal 21 may be a well-known accelerator pedal 21 with a rubberized non-skid coating on its foot-surface 26. Accelerator shaft 22 may be made of spring steel through its entire length which allows the accelerator shaft 22 to bend in response to pressure exerted against the foot surface 26 of the accelerator pedal 21, even if the housing end 29 of accelerator shaft 22 is locked in place. Accelerator shaft 22 may pass through housing 23 through an opening or bushing notch 48 (see FIG. 2). Contained in bushing notch 48 may be bushing 40. Bushing 40 may be any well-known brass bushing. Alternatively, bushing 40 may be a roller bearing. Housing 23 may be a hard metal housing which prevents tampering with the housing and makes the housing difficult to disturb with large cutters. Housing 23 may be constructed of steel, hardened steel and/or solid aluminum. Housing 23 may be affixed to fire wall 24 by long mounting screws 25 mounted from the engine side of the fire wall. Therefore, to remove anti-theft device 20 requires that the person removing housing 23 be underneath the automobile for extended periods of time. While this is simple to accomplish while the automobile is on risers in a factory or in a mechanic shop, it is unattractive to an unauthorized driver. This is an additional theft-deterrent.

As accelerator pedal 21 is compressed by a foot (not shown) applying pressure to accelerator pedal 21 on its foot-surface 26, accelerator shaft 22 pivots toward fire wall 24 around pivot point 33, as illustrated by arrow 37, causing throttle shaft 28, which is coupled to accelerator shaft 22 by main shaft 45, to pivot away from fire wall 24 around pivot point 33, as illustrated by arrow 38, causing throttle cable 36 to be pulled in the direction illustrated by arrow 38, causing the engine to rev above idle. While this is one well-known connection between the accelerator system and the throttle system, the device may be modified to accommodate different throttle system designs and different shapes and types of accelerator-throttle linkages.

Figure 2:
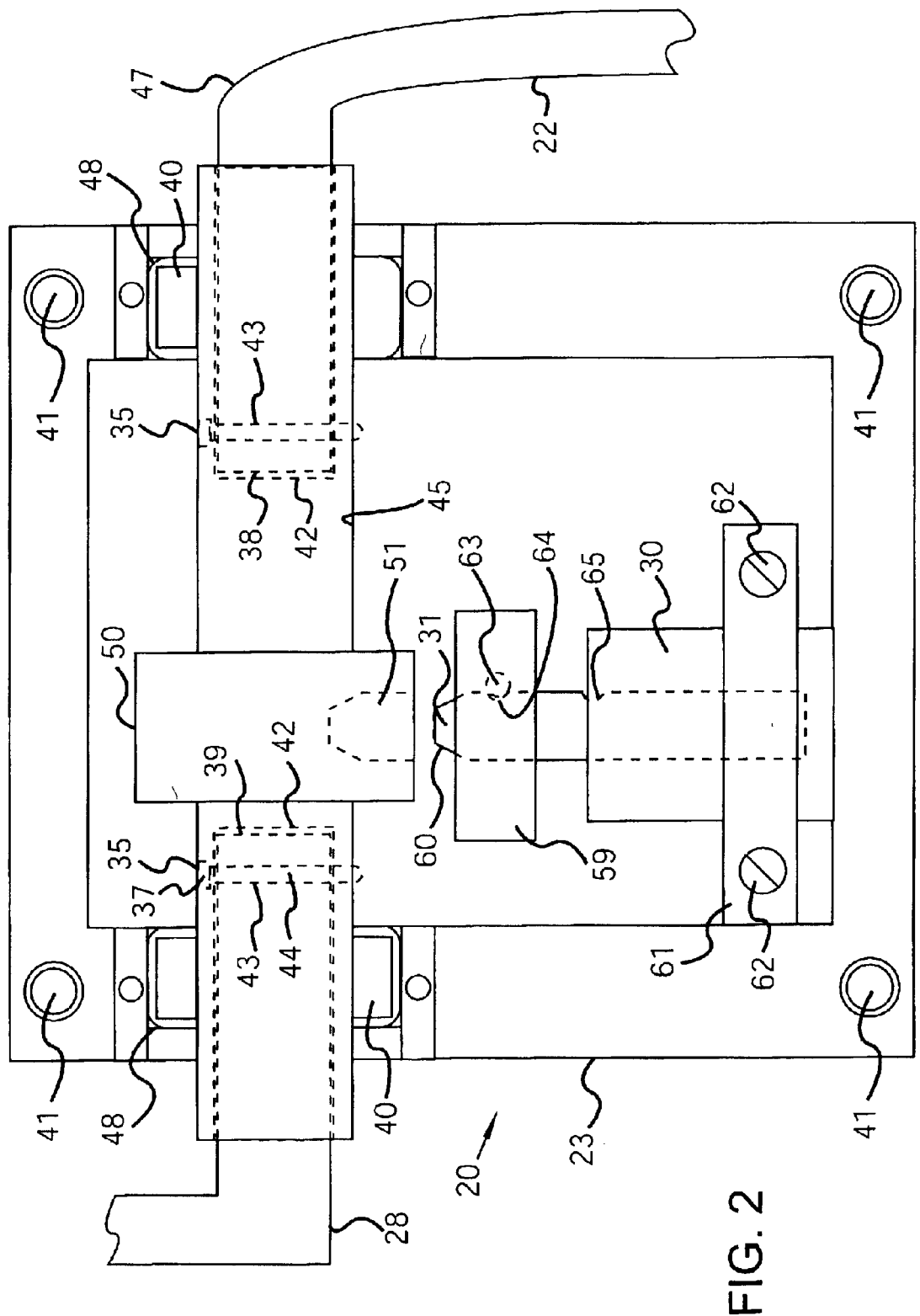
FIG. 2 is a front view of the anti-theft device of FIG. 1 with its lid removed.

FIG. 2 illustrates that anti-theft device 20 may be affixed to fire wall 24 (see FIG. 1), with lid (not shown) of housing 23 removed so that the contents of housing 23 are visible. Housing 23 may have four through holes 41 through which mounting screws 25 (see FIG. 1) pass. Main shaft end 38 of accelerator shaft 22 inserts into first bore hole 42 of main shaft 45. Main shaft 45 passes through first bushing 40. Accelerator shaft 22 is locked in main shaft 45 by locking pin 35. Main shaft end 39 of throttle shaft 28 inserts into second bore hole 42 of main shaft 45. Main shaft passes through second bushing 40. Second locking pin 35 attaches main shaft end 39 of throttle shaft inside second bore hole 42 in the throttle end of main shaft 45. Throttle shaft 28 bends at approximately a 90° angle to turn up toward its connection with a throttle cable (not shown).

Accelerator shaft 22 is attached to main shaft 45 which is attached to throttle shaft 28. When pressure is applied to accelerator pedal 21 (see FIG. 1), accelerator shaft 22 moves (see arrow 37, FIG. 1), causing a rotational movement of main shaft 45 around pivot point 33 (see FIGS. 1 and 4) which is the central axis of main shaft 45. Throttle shaft 28, attached to main shaft 45, also rotates around pivot point 33 (see FIGS. 1 and 4) which is the central axis of main shaft 45. Main shaft 45 may be a ¾ inch solid steel cylinder with bore holes 42 at each end to receive accelerator shaft 22 and throttle shaft 23. Main shaft 45 also may have two locking pin holes 43 into which locking pins 35 are inserted and solenoid pin hole 51 into which solenoid pin 31 inserts.

FIG. 2 also illustrates locking pins 35 which may be safety break-away pins. Locking pins 35 may be made of aluminum. In the event that a large force is applied to accelerator pedal 21 (see FIG. 1) and accelerator shaft 22 (a stomping force), locking pins 35 could be the first to break, by shearing the head 37 of locking pin 35 away from the body 44 of locking pin 35, allowing accelerator shaft 22 to rotate inside main shaft 45 without transferring the rotational motion to main shaft 45 and to throttle shaft 28. Thus, if an unauthorized driver were to stomp on the accelerator pedal, with the locking device engaged, instead of disabling the lock and enabling the automobile to accelerate, the unauthorized driver would simply irreversibly disable the automobile's ability to accelerate. These sheered locking pins 35 could be easily replaced by a person with knowledge of the device by removing the lid of housing 23 and replacing the sheared pins.

FIGS. 1–2 also illustrate that anti-theft device 20 may be simple to install and replace. For the exemplary purposes of this disclosure, in the aftermarket, a "kit" containing the replacement for the factory bushing (which is affixed to the passenger side of the firewall of the automobile just like the factory bushing), could contain housing 23 containing push-pull solenoid 30, a replacement steel shaft for throttle shaft 28 which could attach to throttle cable 36 according to factory specifications at one end, and could contain a hole for locking pin 35 at the other end. The kit could also contain a replacement spring steel shaft for accelerator shaft 22 with an accelerator pedal 21 at one end and a hole for locking pin 35 at the other end. The factory bushing and Z-shaped rod could be removed from their attachments and discarded. Housing 23 could be affixed to firewall, and lid (not shown) of housing 23 could be left open. Throttle shaft 28 could be inserted into main shaft 45 and locked in place with locking pin 35. Accelerator shaft 22 could be inserted into main shaft 45 and locked in place with locking pin 35. Throttle shaft 28 could be attached to throttle cable (not shown) according to factory specifications. Placement of solenoid pin 31 into hole 51 in locking disk 50 could be adjusted by adjusting guide plate with shaft lock 59 before lid (not shown) of housing 23 is attached to housing 23 with mounting screws 25.

Alternatively and also for the exemplary purposes of this disclosure, if anti-theft device 20 is installed in the factory as the automobile is being assembled, throttle shaft 28, housing 23 and accelerator shaft 22 (attached to accelerator pedal 21) could be attached to throttle cable 36 (not shown) and firewall 24 in place of the common factory bushing. Little, if any, retooling would be needed at the factory to install anti-theft device 20.

FIG. 2 also illustrates that fixedly attached to main shaft 45 may be locking disk 50. Locking disk 50 may be a hardened steel disk, attached to main shaft 45 by welding or other attachment means, or cast as a single unit with main shaft 45. Locking disk 50 may have a hole 51 or aperture for receiving pin 31 or locking shaft of push-pull solenoid 30. Pin 31 may have a tapered end 60 to assist with moving slidingly into hole 51. Pin 31 may be rounded, blade shaped, cylindrical, or other rectilinear or curvilinear shapes. Hole 51 may be shaped to receive pin 31. Push-pull solenoid 30 is affixed to housing 23 by push-pull solenoid hold down clamp 61 which is attached to housing 23 by screws 62. Pin 31 is guided into hole 51 of locking disk 50 by guide plate with shaft lock 59. Guide plate with shaft lock has a detent ball 63. Detent ball 63 may be made of hardened ball bearing steel. Pin 31 may have two detents, an unlocked detent 64 and a locked detent 65. When pin 31 is in the unlocked position (as shown in FIG. 2), unlocked detent 64 is engaged against detent ball 63. When pin 31 is in the locked position, pin 31 is extended upwards into hole 51 of locking disk 50, and locked detent 65 is engaged against detent ball 63. When pin 31 is in the locked position, with pin engaged inside hole 51 of locking disk 50, main shaft 45 is locked in place and may not rotate around its central axis (or pivot point 33). Pin 31 or locking shaft, is selectively extendable into hole 51 or aperture, such that when pin 31 or locking shaft is not extended into hole 51 or aperture, the accelerator system may operate the throttle system, and when pin 31 or locking shaft is extended into hole 51 or aperture the accelerator system is prevented from operating the throttle system.

Alternatively, main shaft 45 may have a larger diameter along its entire length, and hole 51 may be in main shaft, without locking disk 50. Pin 31 may then engage slidingly into hole 51 in main shaft 45. In addition, guide plate with shaft lock 59 is not necessary, simplifying the manufacture of anti-theft device 20 and decreasing manufacturing costs.

FIG. 2 illustrates that when pin 31 is engaged inside hole 51 and pressure is applied against accelerator pedal 21 (see FIG. 1), because main shaft 45 cannot rotate (because it is locked in place) accelerator shaft 22 cannot rotate around pivot point 33, no rotational motion may be translated to throttle shaft 28, and the automobile engine will not rev above idle. However, because accelerator shaft 22 may be made of spring steel, accelerator shaft 22 may flex. This flexion may occur at the bend 47 of accelerator shaft 22. Therefore, although accelerator shaft 22 cannot rotate around pivot point 33, translating its rotational motion to throttle shaft 28, it may move by allowing flexion in accelerator shaft 28 itself. Therefore, although no torque is being transmitted to throttle shaft 28 and throttle (not shown), a person pressing down on accelerator pedal 21 (see FIG. 1), would feel some movement in the accelerator pedal 21 (see FIG. 1) but the engine would not rev above idle. Because of this, a would-be thief might not be tempted to simply press with force (stomp) on the accelerator pedal 21 which might break the locking mechanism, which would also cause the accelerator system to be unable to operate the throttle system. In addition, because the spring steel of the accelerator shaft 22 absorbs some of the energy of pressure on the accelerator pedal 21, locking pins 35 will not sheer unless extraordinary force is applied to accelerator pedal 21. The continued performance the accelerator pedal 21 might cause a would-be-thief to think that the automobile is in need of repair, and therefore not a good candidate for theft. Therefore, spring steel or other flexion may prevent lock damage and confuses the unauthorized driver.

Alternatively, accelerator shaft 22 may be made of metal and have a spring-like element at its bend 47 (see FIG. 2) before it inserts into main shaft 45. When a foot presses on the foot-surface of the accelerator pedal 21, if the main shaft 45 lock is engaged, the accelerator shaft 22 twists around the spring-like element and "gives", lending a nearly normal "feel" to the accelerator pedal 21, without successfully engaging throttle shaft 28 and without successfully revving the engine. Alternatively, this flexion may occur by the use of a slip clutch, hydraulic or viscous coupling or geared coupling.

Figure 3:
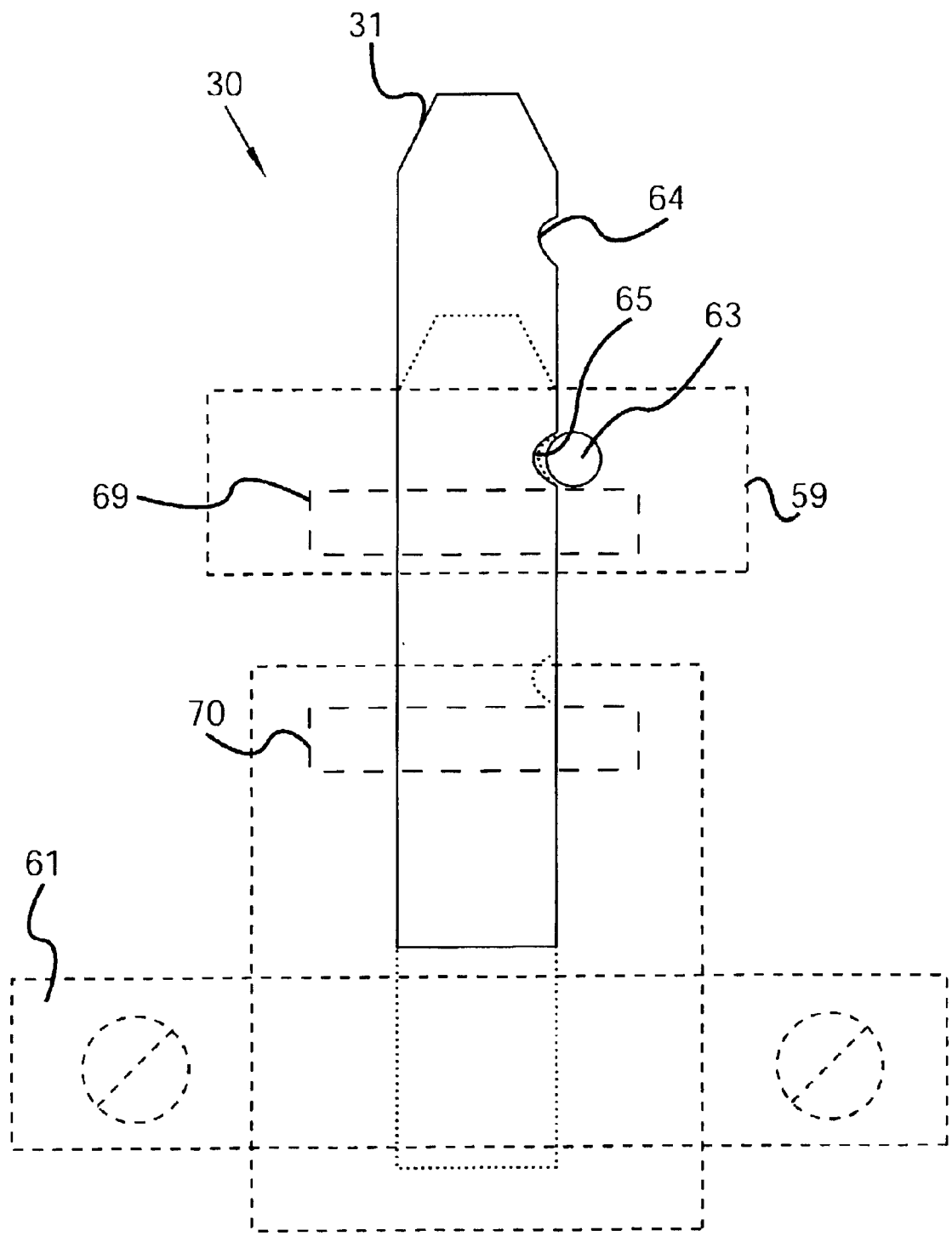
FIG. 3 is a front view of a solenoid of the anti-theft device of FIG. 1.

FIG. 3 illustrates push-pull solenoid, pin 31 with unlocked detent 64 and locked detent 65, guide plate with shaft lock 59, push-pull solenoid hold down clamp 61 and detent ball 63. Pin 31 may be made of ferrous steel or other magnetic metallic material. Push-pull solenoid 30 may have a locking coil 69 and an unlocking coil 70. When an "on" button is pushed on a well-known remote control device as subsequently explained sending an "on" signal, locking coil 69 is energized, creating a magnetic field which causes pin 31 to center itself in relation to locking coil 69. When pin 31 is centered in relation to locking coil 69, locked detent 65 sets against detent ball 63 to hold pin 31 in place in the locked position, even when pin 31 is not aligned with hole 51 of locking disk 50. Thus, once pin 31 is in place in the locked position (as illustrated in the solid lines in FIG. 3), locking coil 69 does not need to be continuously energized because pin 31 is held in the locked position by detent ball 63.

When an "off" button is pushed on the well-known remote communication system sending an "off" signal, the unlocking coil 70 is energized, creating a magnetic field which causes pin 31 to center itself in relation to unlocking coil 70. When pin 31 is centered in relation to unlocking coil 70, unlocked detent 64 centers against detent ball 63 to hold pin 31 in place. Thus, once pin 31 is in place in the unlocked position, (as illustrated in the dashed lines in FIG. 3), unlocking coil 70 does not need to be continuously energized in order to maintain pin 31 in the unlocked position. This feature of remaining locked or unlocked without continuously requiring power makes anti-theft device 20 less susceptible to theft. An unauthorized driver cannot simply cut a power source to the locking device to disable the locking system. In addition, because continuously energizing a coil of a solenoid risks excessive heat build-up and burn-out of the solenoid coils, this feature also reduces the risk of solenoid burn-out.

Alternatively, solenoid pin 31 may be suspended above main shaft 45 and held in place by a magnet. To lock main shaft 45, a push solenoid may be employed to push magnetic solenoid pin 31 away from the magnet, dropping solenoid pin 31 into solenoid pin aperture 52. Then a magnetic pulse from a solenoid could be employed to retrieve solenoid pin 31 from solenoid pin aperture 52. In this way, gravity could be employed to drop solenoid pin 31 in place even if solenoid pin aperture 52 is not aligned with pin 31. Then, when main shaft 45 rotates and solenoid pin 31 becomes aligned with solenoid pin aperture 52, solenoid pin 31 may simply drop into place. Therefore, this embodiment may be a gravity-loaded solenoid.

Figure 5:
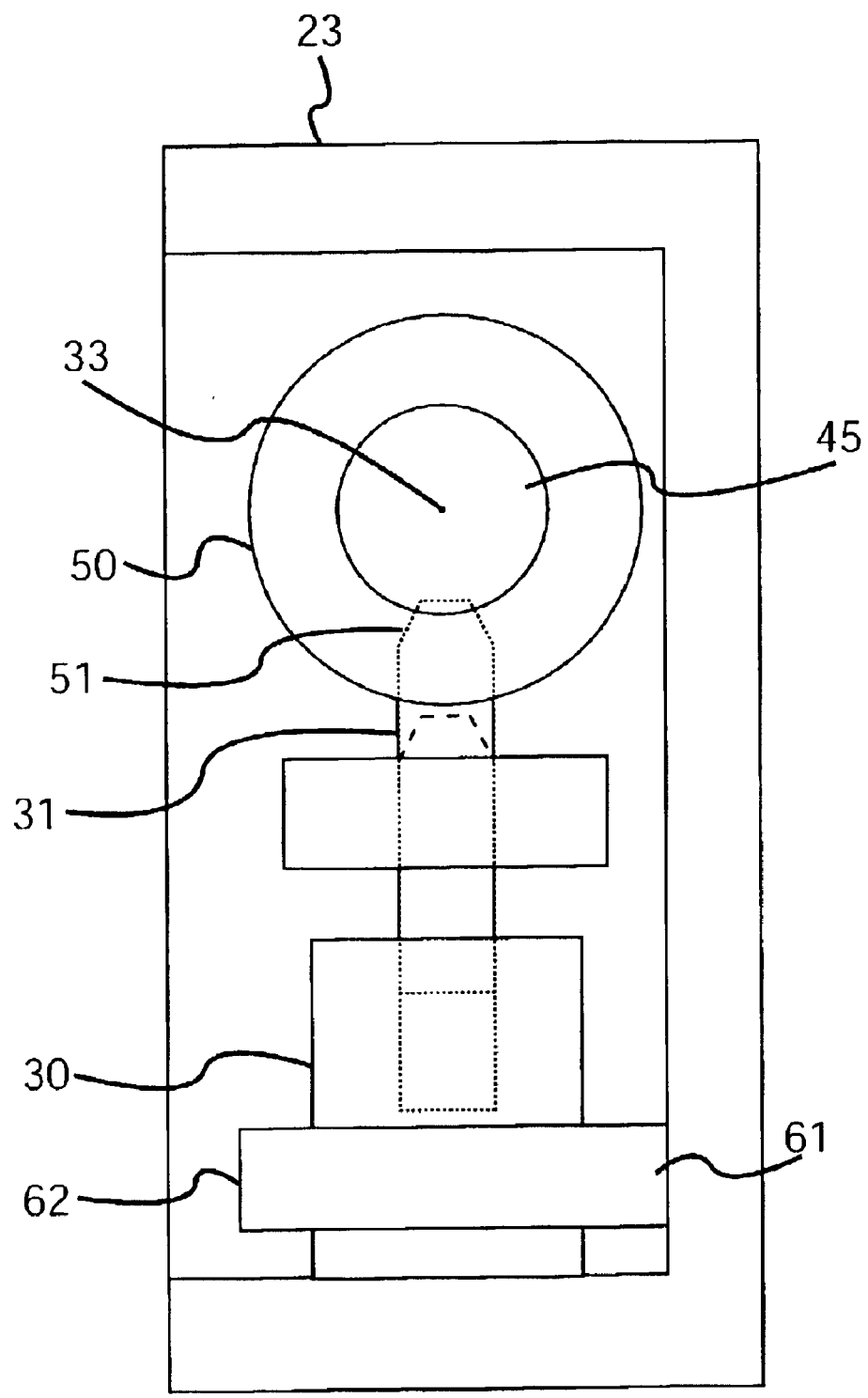
FIG. 5 is a cut-away side view of the anti-theft device of FIG. 1 in the locked position.

FIG. 5 is a cut-away side view illustrating anti-theft device 20 in the locked position with solenoid pin 31 inserted into hole 51 in locking disk 50, preventing locking disk 50 and main shaft 45 from rotating about pivot point 33 which is the central axis of main shaft 45. FIG. 5 also illustrates push-pull solenoid hold down clamp 61 held in place by screws 62. Notwithstanding, solenoid may be any other type of well-known electro-mechanical actuators such as servos or motors to receive a signal from the switch and in response to the signal to insert or remove the locking shaft from the aperture. The locking mechanism may also be a hook dropped into a recess in or on main shaft 45, or may be any form of mechanical interruption in the rotation of main shaft 45.

Figure 4:
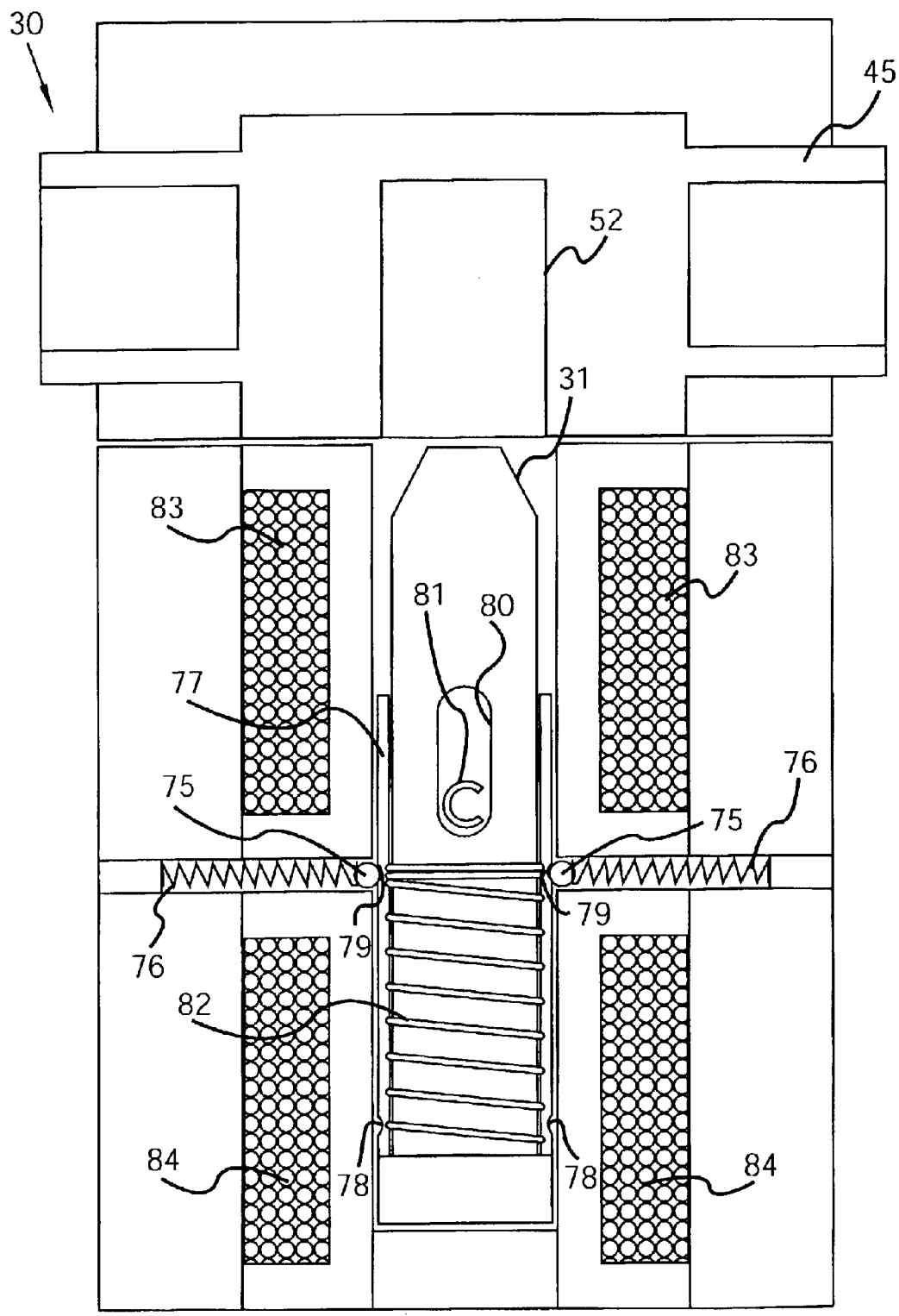
FIG. 4 is a front view of a solenoid configured according to another embodiment of the present invention.

FIG. 4 illustrates an alternate embodiment of the solenoid 30. In this alternate embodiment, solenoid 30 has two detent balls 75 with detent springs 76 and a solenoid pin 31. Solenoid pin 31 may be made of stainless steel. Solenoid pin 31 has a sliding pin slot 80. Solenoid pin 31 may be encased in magnetic case 77 which has locked detents 78 and unlocked detents 79. Magnetic case 77 also has an integral roll pin 81 which fits slidingly inside sliding pin slot 80. Also inside magnetic case 77 is spring 82, embodying herein a spring-loaded solenoid.

As illustrated in the embodiment in FIG. 4, to engage the locking mechanism a signal from a remote source such as a remote control energizes the locking coil 83 which causes magnetic case 77 to center itself in relation to locking coil 83. When magnetic case 77 is centered in relation to locking coil 83, locked detents 78 are opposite detent balls 75, which hold magnetic case 77 in place in the locked position. If solenoid pin aperture 52 is aligned with solenoid pin 31, then solenoid pin 31 extends into solenoid pin aperture 52, locking main shaft 45. If solenoid pin aperture 52 is not aligned with solenoid pin 31, magnetic case 77 moves, spring 82 which is contained inside magnetic case 77 compresses and roll pin 81 slides inside sliding pin slot 80, but solenoid pin 31 cannot advance into solenoid pin aperture 52. Solenoid pin 31 is loaded or spring-loaded.

As soon as main shaft 45 rotates into alignment with solenoid pin 31 (when a driver takes her foot off of the accelerator pedal 21), solenoid pin 31 is forced to advance into solenoid pin aperture 52, by spring 82. Therefore, the solenoid may be a spring-loaded solenoid. In this manner, anti-theft device 20 may be engaged even while the car is accelerating (while the accelerator pedal 21 is pressed and main shaft 45 is rotated away from its position at rest) without continuously energizing locking coil 83. To disengage solenoid pin 31, unlocking coil 84 is energized, causing magnetic case 77 to center itself in relation to unlocking coil 84 and aligning its unlocked detents 79 with detent balls 75. Solenoid pin 31 then drops back into the unlocked position illustrated in FIG. 4.

Figure 6:
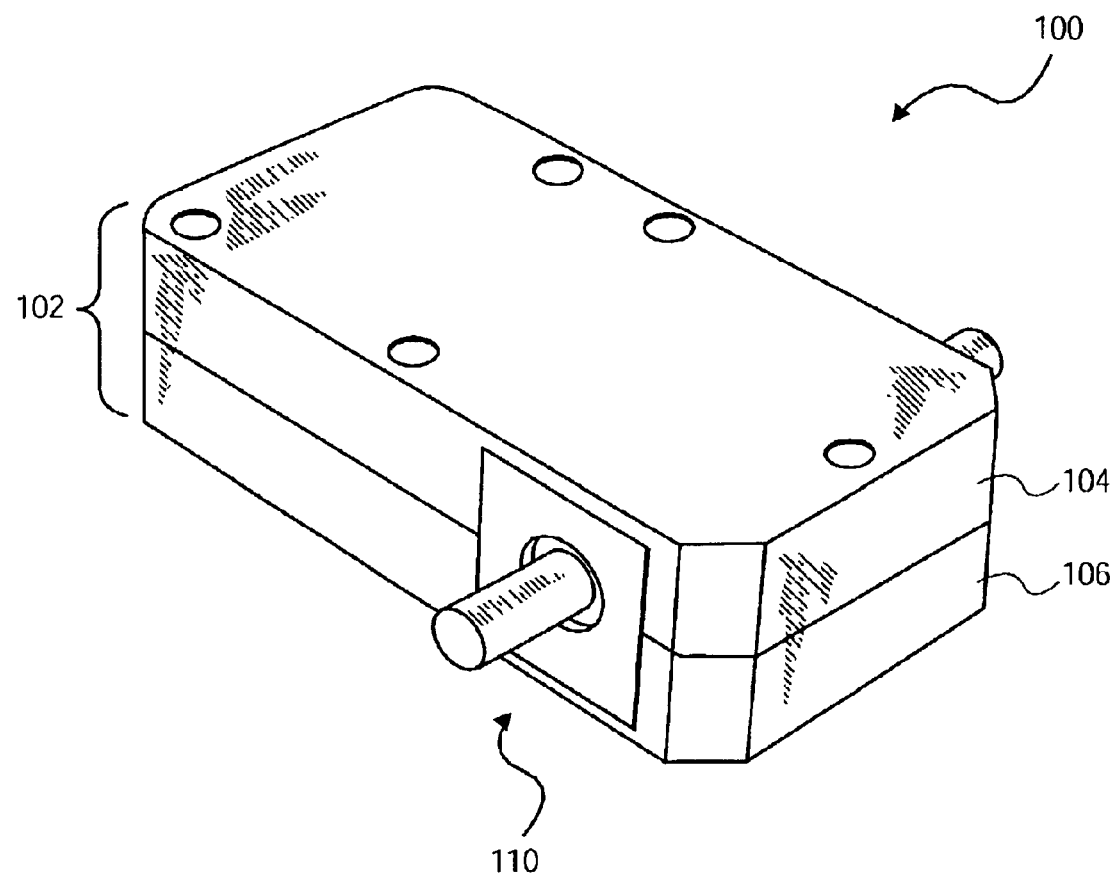
FIG. 6 is an isometric view of an anti-theft device configured according to another embodiment of the invention.

With reference to FIG. 6, although the invention may be readily adapted to a variety of embodiments of an automobile anti-theft device, anti-theft device 100 is another example of an automobile anti-theft device of the invention. Describing anti-theft device 100 generally, anti-theft device 100 may generally include housing 102, decoupling assembly 110, locking pin assembly 140, and actuator assembly 160 in operative conjunction with one another.

Describing anti-theft device 100 in greater detail, anti-theft device 100 may include housing 102. Housing 102 may be generally rectilinear (e.g. polygonal, such as rectangular) in shape and may comprise upper housing portion 104 and lower housing portion 106. The corners of upper housing portion 104 and lower housing portion 106 may be beveled or rounded. The mating surfaces of upper and lower housing portions 104 and 106 may each comprise securing apertures 108 and recess portions of various sizes and shapes positioned at predetermined locations consistent with the intended mechanical and/or electrical operation of anti-theft device 100. The recess portions are configured to slidably receive therein decoupling assembly 110, locking pin assembly 140, and actuator assembly 160 and to retain them in operative positions within housing 102 as will hereinafter be described. Securing apertures 108 may be for any security fasteners such as headless screws, tap-through screws, rivets or other similar fastening devices. For the exemplary purposes of this disclosure, securing apertures 108 may be synchronously tapped/threaded and may be configured to maintain alignment and some space between upper housing portion 104 and lower housing portion 106 to account for expansion when housing 102 is affixed to fire wall 24 by long mounting screws, such as screws 25 previously described, mounted from the engine side of the fire wall for example.

Figure 8:
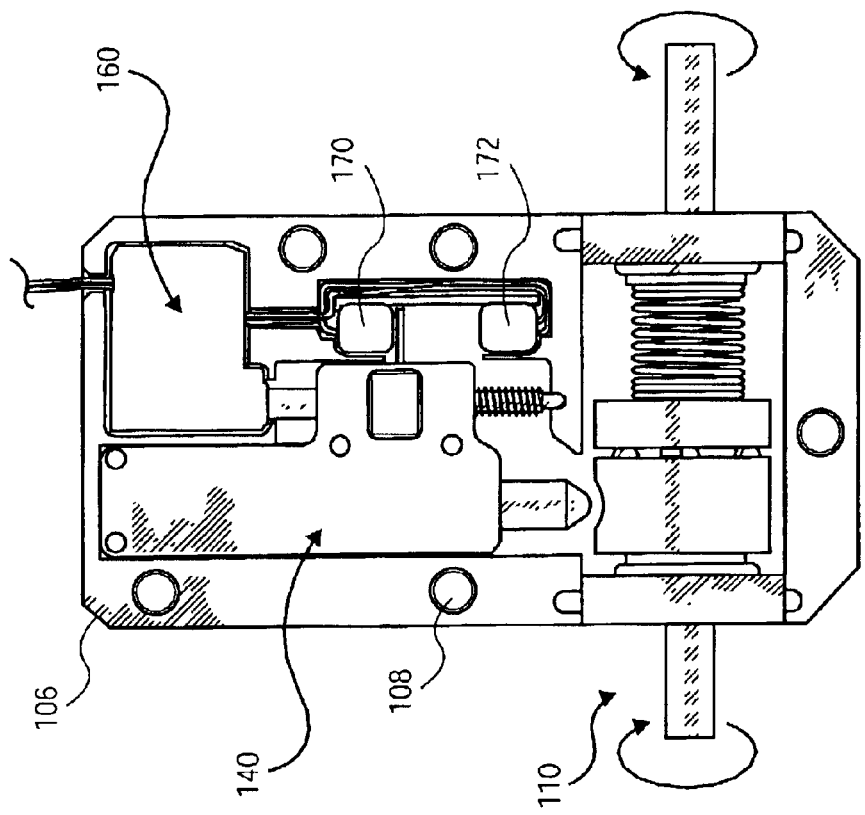
FIGS. 7 and 8 are top views of a lower housing portion of the anti-theft device of FIG. 6.
Figure 7:
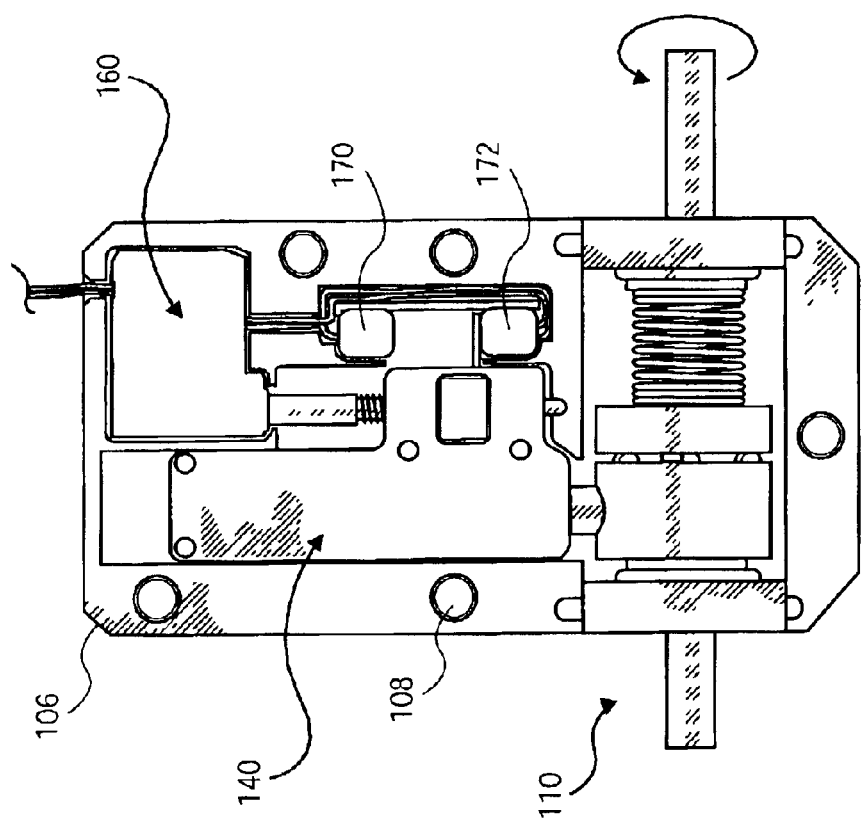
Figure 9:
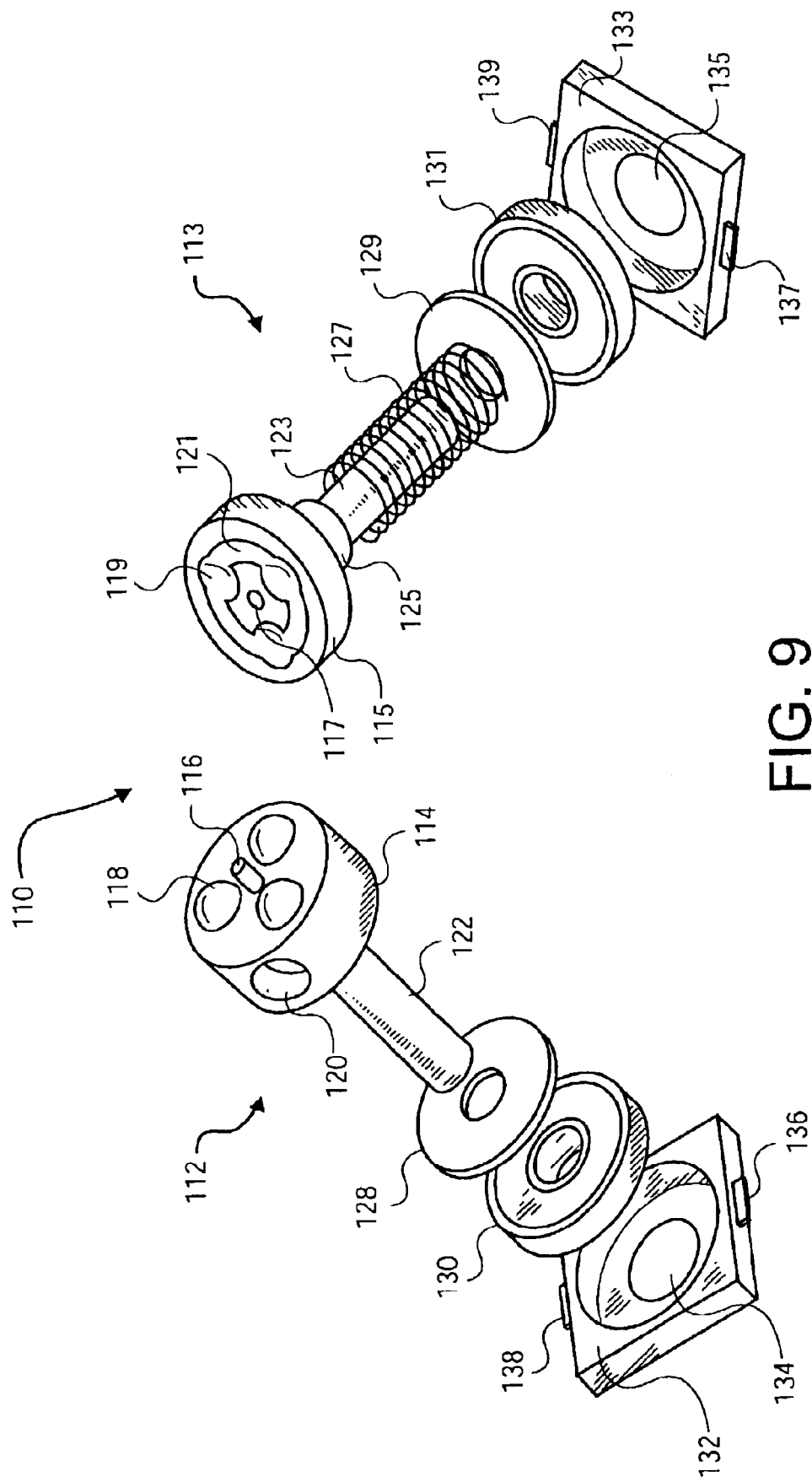
FIG. 9 is an isometric exploded view of a decoupling assembly of the anti-theft device of FIG. 6.
Figure 10:
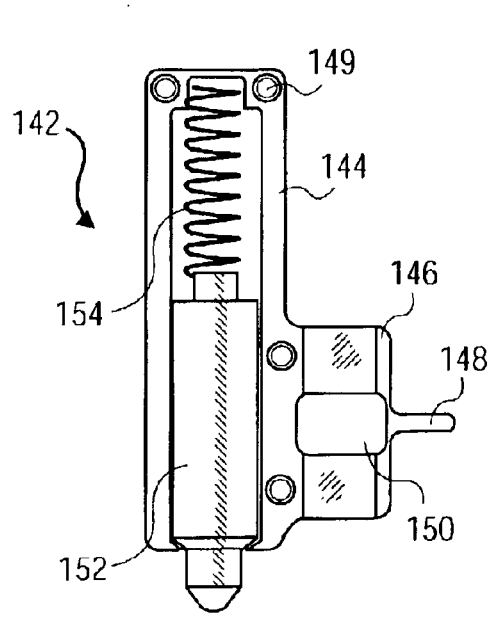
FIG. 10 is a top view of a locking pin and spring disposed within a lower housing portion of a locking pin assembly of the anti-theft device of FIG. 6.
Figure 11:
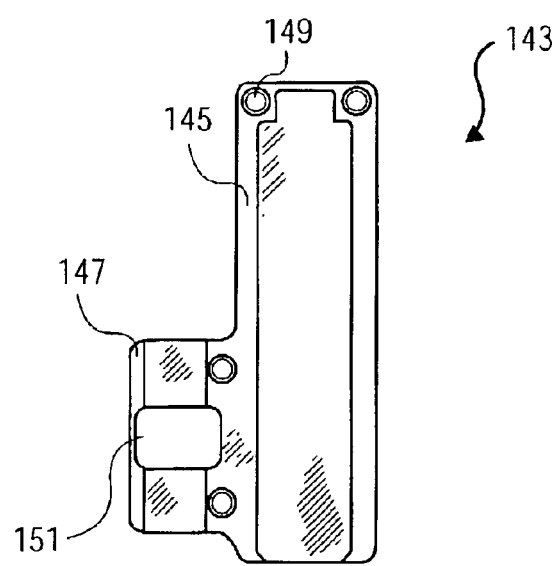
FIG. 11 is a bottom view of an upper housing portion of the locking pin assembly of the anti-theft device of FIG. 6.
Figure 12:
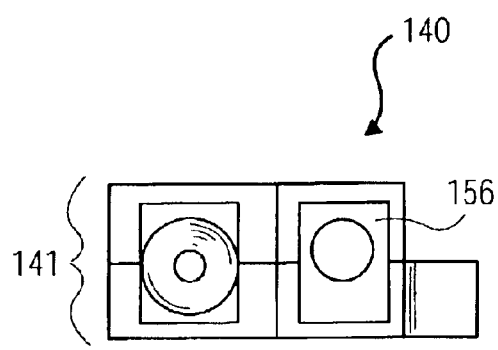
FIG. 12 is a front end view of the locking pin assembly of the anti-theft device of FIG. 6.

Decoupling assembly 110 may be substantially disposed within housing 102. Decoupling assembly 110 may be configured both to transfer motion from an accelerator system to the throttle system for example to cause an automobile's engine to rev above idle during normal operation and to reversibly disengage an accelerator system from a throttle system of an automobile when in an operative relationship with locking pin assembly 140 when anti-theft device 100 is locked or during emergency operation. As depicted in FIGS. 7–9 and for the exemplary purposes of this disclosure, decoupling assembly 110 may be any ball/clutch configuration, though any type of slip configuration is within the scope of the present invention, such as slip clutch, hydraulic or viscous coupling, or geared coupling configurations for example.

Accordingly, decoupling assembly 110 may include first decoupling portion 112 and second decoupling portion 113. First decoupling portion 112 may be configured to couple with a throttle system and to removably couple with locking pin assembly 140 as hereinafter described. First decoupling portion 112 may include first decoupling disc 114, first main shaft 122, first washer 128, first bushing 130, and first retainer plate 132. Second decoupling portion 113 may be configured to couple with an accelerator system. Second decoupling portion 113 may include second decoupling disc 115, second main shaft 123, spring 127, second washer 129, second bushing 131, and second retainer plate 133.

First decoupling disc 114 may be configured to removably couple with both second decoupling disc 115 and locking pin 152. Accordingly and for the exemplary purposes of this disclosure, first decoupling disc 114 may include alignment pin 116, ball bearings 118, bearing recesses 119, and locking pin recess 120. Second decoupling disc 115 may be configured to removably couple with first decoupling disc 114. Accordingly and for the exemplary purposes of this disclosure, second decoupling disc 115 may include alignment pin recess 117, bearing recesses 119, and bearing track 121. Alignment pin 116 is configured to couple within alignment pin recess 117. Bearings 118 are removably located within bearing recesses 119 and are configured to roll along track 121 to facilitate rotation of second decoupling portion 113 when locking pin recess 120 of first decoupling portion 112 has removably coupled therein locking pin 152 of locking pin assembly 140.

First main shaft 122 may be configured to receive first washer 128, first bushing 130, and first retainer plate 132 so as to retain them in an operative relationship, as well as to be coupled to or integrally joined with any throttle system. For the exemplary purposes of this disclosure, first main shaft 122 may be coupled to or integrally joined with a throttle shaft, such as throttle shaft 28 of FIGS. 1–2 for example as previously described, such as with a sleeve and set screws. First main shaft 122 may be a solid cylindrical shaft, a cylindrical shaft with central apertures defined in opposing ends thereof, or an annularly cylindrical shaft. Notwithstanding, first main shaft 122 may have other components depending upon the particular throttle system it is coupled to for example.

Second main shaft 123 may be configured to receive spring 127, second washer 129, second bushing 131, and second retainer plate 133 so as to retain them in an operative relationship, as well as to be coupled to or integrally joined with an accelerator system, such as an accelerator shaft like accelerator shaft 22 of FIGS. 1–2 for example as previously described, such as with a sleeve and set screws. For the exemplary purposes of this disclosure, second main shaft 123 may be a solid, two-tiered cylindrical shaft, a two-tiered cylindrical shaft with central apertures defined in opposing ends thereof, or a two-tiered annularly cylindrical shaft. The first, larger tier of second main shaft 123, namely hub 125, is configured for receiving an end portion of spring 127.

Spring 127 is resilient and may be configured both to bias second decoupling portion 113 in an engaged position with first decoupling portion 112 during normal operation when motion is being transferred from an accelerator system to the throttle system to cause the car's engine to rev above idle for example and to collapse and allow second decoupling portion 113 to disengaged from first decoupling portion 112 when anti-theft device 100 is locked or during emergency operation once locking pin assembly engages with first decoupling portion 112. For the exemplary purposes of this disclosure, spring 127 is cylindrical helical spring that fits over and along second main shaft 123. Spring 127 has a first end portion seating over hub 125 and against the back face of second decoupling disc 115 and having a second, opposing end portion seating against the front face of second washer 129.

First washer 128 and second washer 129 may each be configured to space apart first decoupling disc 114 and second decoupling disc 115 from bushings 130 and 131 respectively, second washer 129 also configured to provide a stop for spring 127 as previously described. For the exemplary purposes of this disclosure, first washer 128 and second washer 129 may each be a thin disc with a central aperture therethrough.

First bushing 130 and second bushing 131 are each configured to allow first and second main shafts to rotate freely therein. For the exemplary purposes of this disclosure, first bushing 130 and second bushing 131 may be any well-known bushings, such as brass bushings, or any other structures that would allow first and second main shafts to rotate freely, such as roller bearings.

Decoupling assembly 110 may be retained in operative position within housing 102 by opposing retainer plates 132 and 133 compatible with and coupled to or integrally joined with internal portions of opposing housing portions 104 and 106 of housing 102. For the exemplary purposes of this disclosure, first opposing flanges 136 and 138 and second opposing flanges 137 and 139 of opposing retainer plates 132 and 133 respectively may be configured to couple with opposing side recess portions of channels extending latitudinally across opposing housing portions 104 and 106 to retain decoupling assembly 110 in an operative position within housing 102. Opposing retainer plates 132 and 133 may further include first and second central apertures 134 and 135 respectively. For the exemplary purposes of this disclosure, first and second central apertures 134 and 135 each may comprise two-tiered, cylindrical, central apertures extending therethrough. First, larger tiers (i.e. first and second bushing notches) of first and second central apertures 134 and 135 respectively are configured for receiving first and second bushings 130 and 131 respectively. Second, smaller tiers (i.e. first and second main shaft bores) of first and second central apertures 134 and 135 respectively are configured for both receiving first and second main shafts 122 and 123 respectively and stopping first and second bushings 130 and 131 respectively.

A factory bushing commonly found affixed to the floor of the passenger compartment of an automobile typically provides a pivot point for a substantially Z-shaped metal bar which transfers motion of the accelerator pedal, through a well-known attachment point, to a throttle of an engine for example. Accordingly and for the exemplary purposes of this disclosure, in anti-theft device 100, an accelerator shaft may be coupled at one end to an accelerator pedal and at the other end to a distal end portion of second main shaft 123 of second decoupling portion 113 of decoupling assembly 110. A throttle shaft may be coupled at one end to a distal end portion of first main shaft 122 of first decoupling portion 112 of decoupling assembly 110. A central axis of first and second main shafts 122 and 123 of decoupling assembly 110 may form a pivot ax-is of the accelerator-throttle coupling. Thus, together, the accelerator shaft, decoupling assembly 110, and the throttle shaft may form a replacement Z-shaped complex that either may transfer motion from an accelerator pedal to the throttle system to cause the car's engine to rev above idle during normal operation (FIG. 8), or may not transfer motion from an accelerator pedal to the throttle system when second decoupling portion 113 is disengaged from first decoupling portion 112 when anti-theft device 100 is locked or during emergency operation (FIG. 7). Because anti-theft device 100 may replace the factory bushing, it may provides the connection between the accelerator pedal and the throttle system. Cutting through anti-theft device 100 would only serve to sever the connection between the accelerator pedal and the throttle system, rendering the automobile immobile.

Notwithstanding, while the foregoing description is one well-known connection between an accelerator system and a throttle system, anti-theft device 100 may accommodate different throttle system types and designs and different shapes and types of accelerator-throttle linkages as previously explained generally. Drive-by-wire is now established as the technology to replace many of the traditional hydraulically and mechanically operated systems and will increasingly be introduced in the coming years. New drive-by-wire technologies will radically change the electronic and electric architecture of cars and have the potential to increase overall traffic safety, driving convenience, and functionality significantly.

For the exemplary purposes of this disclosure, drive-by-wire systems work by replacing conventional throttle-control systems. For example, first decoupling portion may be coupled to a drive-by-wire pedal-position sensor that operates a servo on a throttle body, thereby replacing the mechanical linkage with an electrical one so the throttle system becomes electrically impulse controlled. Thus, instead of relying on a mechanical cable that winds from the back of the accelerator pedal, through the vehicle firewall, and onto the throttle body, drive-by-wire consists of a sophisticated pedal-position sensor that closely tracks the position of the accelerator pedal and sends this information to a fault-tolerant Engine Control Module (ECM). This is superior to a cable-operated throttle system for the following reasons. First, by eliminating the mechanical elements and transmitting a vehicle's throttle position electronically, drive-by-wire greatly reduces the number of moving parts in the throttle system. This means greater accuracy, reduced weight, and, theoretically, no service requirements (like oiling and adjusting the throttle cable). Second, the greater accuracy not only improves the driving experience (increased responsiveness and consistent pedal feel regardless of outside temperature or pedal position), but it allows the throttle position to be tied closely into ECM information like fuel pressure, engine temperature, and exhaust gas re-circulation. This means improved fuel economy and power delivery as well as lower exhaust emissions. Third, with the pedal inputs reduced to a series of electronic signals, it becomes a simple matter to integrate a vehicle's throttle with non-engine specific items like ABS, gear selection, and traction control. This increases the effectiveness of these systems while further reducing the amount of moving parts, service requirements, and vehicle weight.

Locking pin assembly 140 may also be disposed within housing 102. Locking pin assembly 140 may be configured to slidably move back and forth within compatible recess portions positioned at predetermined locations into mating surfaces of upper and lower housing portions 104 and 106 and to reversibly disengage an accelerator system from a throttle system, for example, of an automobile when in an operative relationship with decoupling assembly 110. As depicted in FIGS. 7–8 and 10–12, locking pin assembly 140 may include housing 141, locking pin 152, spring 154, and screw block 156 in operative conjunction with one another.

Housing 141 may be generally rectilinear in shape (e.g. L-shaped or T-shaped) and may comprise upper housing portion 143 and lower housing portion 142 with outwardly protruding flange 148 coupled to or integrally joined therewith for engaging limit switches 170 and 172 as hereinafter described. The corners of lower housing portion 142 and upper housing portion 143 may be beveled or rounded. The mating surfaces of lower and upper housing portions 142 and 143 may each respectively comprise securing apertures 149, screw block apertures 151 and 150, and recess portions of various sizes and shapes positioned at predetermined locations consistent with the intended mechanical and/or electrical operation of locking pin assembly 140. Securing apertures 149 may be for any security fasteners such as headless screws, tap-through screws, rivets or other similar fastening devices. Screw block apertures 151 and 150 in the channeled recess portions in shoulder housing portions 147 and 146 of lower and upper housing portions 142 and 143 respectively are configured to receive therethrough screw block 156 and to retain it in an operative position within housing 141 as will hereinafter be described. The two-tiered channeled recess portions in body housing portions 144 and 145 of lower and upper housing portions 142 and 143 respectively are configured to slidably receive therein locking pin 152 and spring 154 and to retain them in an operative position within housing 141 as will hereinafter be described.

Locking pin 152 may be substantially disposed within housing 102. Locking pin 152 may be any detent configured to limit first decoupling portion 112 from turning in an engaged direction when anti-theft device 100 is locked or during emergency operation (FIG. 7). Accordingly, pin 152 may have a tapered, rounded, blade shaped, cylindrical, or other rectilinear or curvilinear shaped end configured to assist pin 152 in its removable sliding engagement with locking pin recess 120 of first decoupling disc 114. For the exemplary purposes of this disclosure, locking pin 152 may be a pin comprising a distal cylindrical hub portion, a cylindrical body portion, and a proximal beveled nose portion. The distal cylindrical hub portion may be configured to receive thereon a proximal end portion of spring 154. The cylindrical body portion may be configured to fit within and along the two-tiered channeled recess portions in body housing portions 145 and 145 of lower and upper housing portions 142 and 143 respectively and to slidably move therein. The proximal beveled nose portion may be configured to assist pin 152 in its removable sliding engagement with locking pin recess 120 of first decoupling disc 114 (FIGS. 7–8).

Spring 154 may be disposed within housing 141. Spring 154 is resilient and configured to bias locking pin 152 in an engaged position with locking pin recess 120 of first decoupling disc 114 or against first decoupling disc 114 during emergency operation. For the exemplary purposes of this disclosure, spring 154 is a cylindrical helical spring with a proximal end portion that fits over and along the distal hub portion of locking pin 152 and a distal end portion seating within the smaller channeled recess portion of the two-tiered channeled recess portions in body housing portions 144 and 145 of lower and upper housing portions 142 and 143 respectively to retain spring 154 distal end portion in an operative position within housing 141.

Screw block 156 may be disposed and retained in an operative position within screw block apertures 151 and 150 in the channeled recess portions in shoulder housing portions 147 and 146 of lower and upper housing portions 142 and 143. Screw block 156 is configured to receive there through screw 164 and to retain it in an operative as will hereinafter be described. For the exemplary purposes of this disclosure, screw block 164 may be a rectilinear (e.g. polygonal, such as rectangular) block with a threaded central aperture there through.

Figure 13:
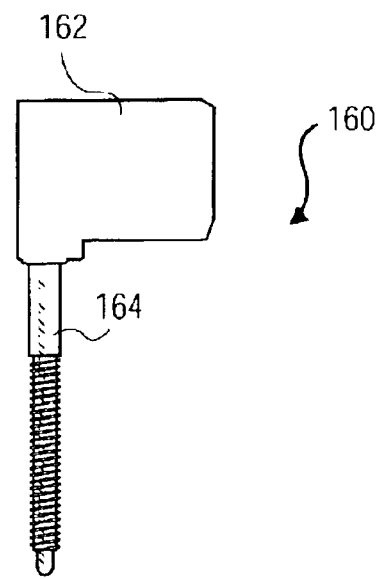
FIG. 13 is a top view of a motor assembly of the anti-theft device of FIG. 6.

Actuator assembly 160 may additionally be disposed within housing 102. Actuator assembly 160 may be configured to enable locking pin assembly's 140 engagement and disengagement of an accelerator system to and from respectively a throttle system of an automobile, for example, when in an operative relationship with locking pin assembly 140. As depicted in FIGS. 7–8 and 13 and for the exemplary purposes of this disclosure, actuator assembly 160 may be any electro-mechanical screw actuator and may include motor 162, screw 164, and first and second limit switches 170 and 172, though actuator assembly 160 may be any other electric and/or mechanical actuating device such as those previously described for example.

Motor 162 may he generally rectilinear (e.g. polygonal, such as rectangular) and may comprise any electro-mechanical motor. Screw 164 is coupled to or integrally joined with motor 162 and extends outwardly there from (e.g. at approximately a right angle). For the exemplary purposes of this disclosure, screw 164 is substantially threaded with its threaded portions in threaded engagement with the threaded central aperture of screw block 156. Depending upon the direction of rotation, as motor 162 rotates screw 164, locking pin assembly 140 slidably moves back and forth within compatible recess portions of upper and lower housing portions 104 and 106 removably disengaging pin 152 from recess 120 of first decoupling portion 112 (FIGS. 7–8). First and second limit switches 170 and 172 are configured to limit the displacement of locking pin assembly 140 within compatible recess portions of upper and lower housing portions 104 and 106 as flange 148 engages them.

Accordingly and with reference to FIGS. 7–8, locking pin 152 may be removably guided into locking pin recess 120 of first decoupling disc 114 by screw 164 of actuator assembly 160. When pin 152 is in the locked position, with pin 152 engaged inside recess 120, first decoupling portion 112 is locked in place and may not rotate around its central axis (FIG. 7). When pin 152 is in the unlocked position, with pin 152 disengaged from recess 120, first decoupling portion 112 is may rotate around its central axis (FIG. 8). Thus, for example, because pin 152 may be selectively extendable into recess 120, when pin 152 is not extended into recess 120, the accelerator system may operate the throttle system, and when pin 152 is extended into recess 120, the accelerator system is prevented from operating the throttle system. When pin 152 is engaged inside recess 120 and pressure is applied against an accelerator pedal, because first decoupling portion 112 is locked in place and may not rotate around its central axis, no rotational motion may be translated to the throttle shaft for example, and the automobile engine will not rev above idle. However, because second decoupling portion 113 may be disengaged from first decoupling portion 112 when anti-theft device 100 is locked or during emergency operation once locking pin assembly engages with first decoupling portion 112, accelerator shaft may rotate when the pedal is depressed. Therefore, although no torque is being transmitted to the throttle shaft and throttle, a person, such as a carjacker, pressing down on the accelerator pedal would feel actual, virtually normal, movement in the accelerator pedal (FIG. 7) but the engine would not rev above idle. The continued performance the accelerator pedal ultimately frustrates and confuses a carjacker, and might cause a would-be-thief to think that the automobile is in need of repair, and therefore, not a good candidate for theft.

The components defining any anti-theft device embodiment of the invention may be formed of any of many different types of materials or combinations thereof that can readily be formed into shaped objects, such as rubber, composites, polymers, polycarbonates, ABS, polystyrenes, PVC, any combination thereof, and/or other like materials, metals, such as zinc, magnesium, copper, iron (e.g. cast iron), steel, (e.g. galvanized, stainless, etc.), any combination thereof, and/or other like materials, alloys, such as aluminum, and/or other like materials, any other suitable material, and/or any combination thereof.

The components defining any anti-theft device embodiment of the invention may be purchased pre-manufactured or manufactured separately and then assembled together. If any of the components of any anti-theft device embodiment are manufactured separately, they may then be coupled with one another in any manner known in the art, such as with adhesive, a weld, a fastener, wiring, any combination thereof, and/or the like for example, depending on, among other considerations, the particular material forming the components. However, the components may be purchased pre-manufactured or manufactured simultaneously and integrally joined with one another. Manufacture of these components separately or simultaneously may involve either extrusion, injection molding, casting, stamping, milling, or the like. Other possible steps might include sand blasting, polishing, and/or powder coating or painting and oven baking the components.

Anti-theft device 100 may be a stand alone system. As a stand alone system, anti-theft device 100 may include an internal battery and a fiber optic or other type of receiver so that anti-theft device 100 may activate if power is cut thereto. Alternatively, anti-theft device 100 may be used with any other remote communication system. Remote communication systems are well-known technology and may include, for example, remote control keyless entry auto lock devices, paging systems, dual tone modulating frequency (DTMF) signals, remote monitoring service such as On-Star®, or hidden switches on or near the dashboard of the automobile. As will be clear to those of ordinary skill in the art, the communication connections and other communication lines described and illustrated in relation to the embodiments of the invention may be configured in any number of configurations known in the art. Some examples of communications connections may include, without limitation, electronic or other data transferring cable (including optical as well as electrical), radio frequency wave transmissions including cellular frequency transmissions as well as microwave, satellite dish frequencies, dual tone modulating frequency (DTMF), etc., "Bluetooth" technology transmissions, and the like, such as is common with remote communication systems. As used herein, the term "remote" means and includes sites using communications connections to communicate one or more signals with another site.

For example, remote control keyless entry auto lock devices are commonly sold with automobiles. These devices have buttons for "lock," "unlock," and may have a security button which may cause a security alarm to sound. The "lock" button on these remote control devices may be programmed to lock automobile anti-theft device 100 as well as door locks, or an additional button may be added to the remote control device to engage or disengage anti-theft device 100. The remote control device may send a well-known radio, microwave frequency, or other signal to electro-mechanical actuator assembly 160. Alternatively or in combination with the foregoing, a panic button may be installed on or around the dashboard of the automobile. Then, if the driver of the automobile is forced to relinquish control of the automobile by an unauthorized driver (i.e. if the driver is carjacked), the owner could discretely press the panic button to engage anti-theft device 100 and disengage the throttle system from the accelerator system. Additionally or in combination with the foregoing, the DTMF might employ well-known pager technology to engage and disengage anti-theft device 100. The automobile owner could subscribe to a pager service. If the owner determines that the automobile could be stolen, the owner could access this pager service, enter a specific security code, and request that a locking signal be sent to the automobile.

Thus, in use, if an automobile and driver have been carjacked after the driver has disengaged anti-theft device 100, anti-theft device 100 may be re-activated with a remote communication switch, such as a pager or a dashboard switch for example, while the automobile is being driven. For safety reasons, in some embodiments the anti-theft system could be designed so that anti-theft device 100 is only engaged if the automobile is traveling less than a prescribed speed (such as 15 miles per hour for example). The remote communications switch could be activated by a passenger inside the automobile, by a police officer in pursuit of the automobile, or by a well-known monitoring system such as On-Star®. For example, the automobile's license plate number could be on file with local law enforcement along with a code for engaging anti-theft device 100. Or a DTMF code could be sent from a cellular telephone to initiate a "lock" signal. A carjacked driver could discretely send a signal to local law enforcement using an integrated pager system. Local law enforcement could then send a "lock" signal to the automobile using an integrated pager system.

For disabling a stolen automobile in motion, once anti-theft device 100 is in the "lock" position (FIG. 7), as soon as the unauthorized driver removes their foot from the accelerator pedal, main shaft rotates so that locking pin recess 120 of first decoupling disk 114 is aligned with locking pin 152, locking pin 152 springs into recess 120, and the accelerator system is disengaged from the throttle system, rendering the automobile unable to accelerate again. The automobile would still be able to make use of power steering and power brakes, because the engine would still be running. However, the driver would be unable to lead a high speed chase. The driver would have no choice but to pull off of a roadway, the driver having no indication that a locking device had been activated.

Figure 14:
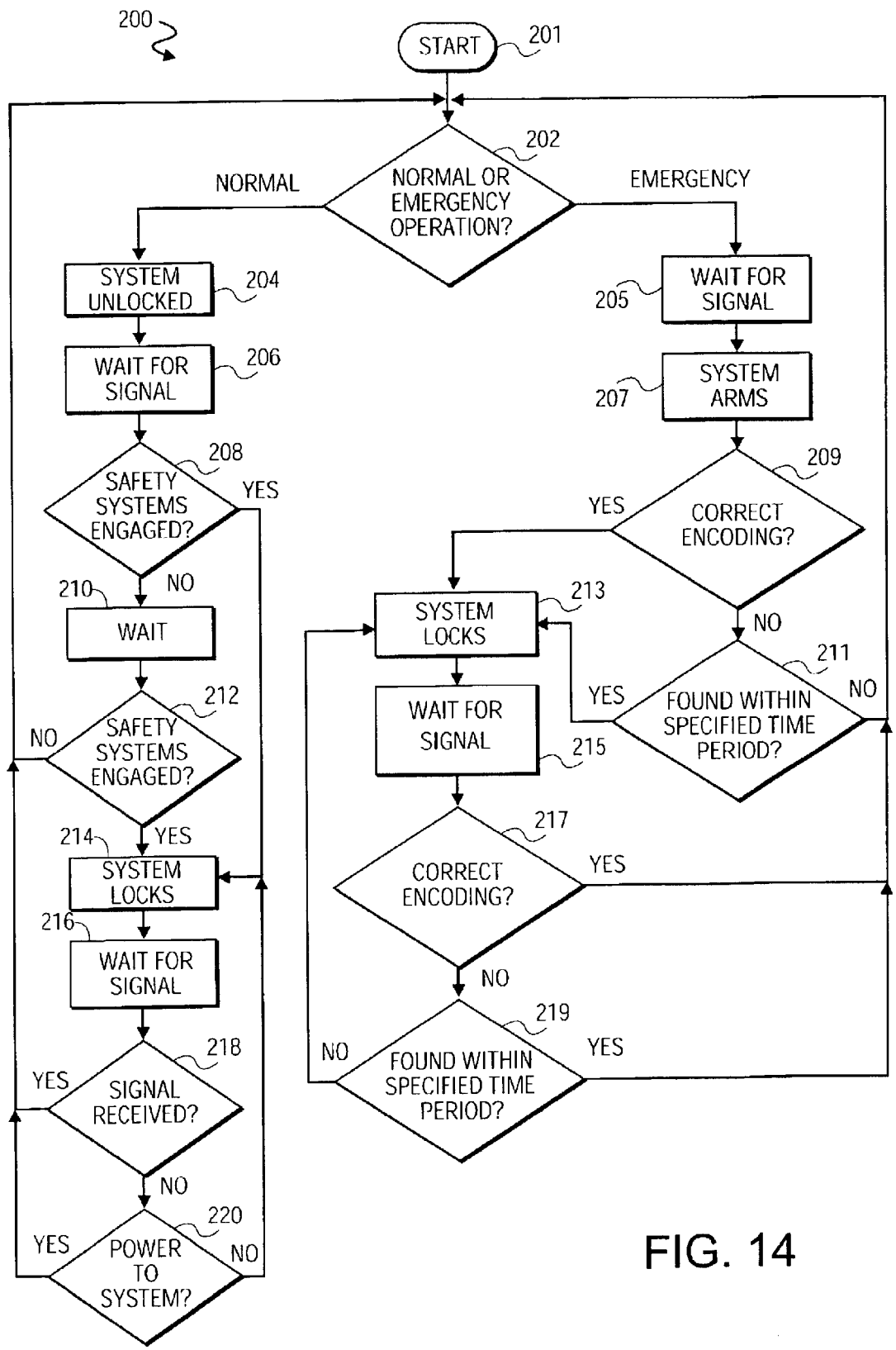
FIG. 14 is a process diagram of a possible operation of any anti-theft device configured according to an embodiment of the present invention.

In describing the use of any anti-theft device configured according to an embodiment of the present invention further, reference is made to FIG. 14. FIG. 14 illustrates a process diagram of the operation of any anti-theft system configured according to an embodiment of the present invention. In addition to anti-theft device 100 for example, any anti-theft system configured according to an embodiment of the present invention may also include one or more expandable program logic controllers (PLCs). Each expandable PLC is a central processing unit that comprises a program with parameter settings that may coordinate and control the operation of, including all the components and functions of, an anti-theft system of the invention, including anti-theft device 100 for example. Each expandable PLC also has associated therewith a local data storage device such as a local hard drive, random access memory (RAM), or other magnetic or electronic data storage medium. The local data storage device may be used for any number of data storage functions common to a processor, but is particularly useful for storing data necessary for the operation of an anti-theft system, such as an operating system and application software/programs. Each PLC also includes connections to other associated hardware, software, and other connections necessary to operate. Moreover, any anti-theft system configured according to an embodiment of the present invention may also include any remote access interface (e.g. a modem) configured to be connected by any form of communication to any remote communication system, thereby allowing any remote communication system to remotely connect to and access each PLC to manage the anti-theft system.

Anti-theft system operation may start with step 201 of the flow diagram. In step 202, the PLC initially determines if the anti-theft system is in normal or emergency operation (step 202). This determination is made based upon the input of any form of communication signal as previously described and as known to those of ordinary skill in the art. If the PLC initially determines the anti-theft system is in normal operation, the anti-theft system is unlocked and in stand by mode (step 204). The PLC waits for a communications signal as previously described (step 206).

Once a communications signal is received, such as from a remote control keyless entry auto lock device, the PLC determines if automobile safety systems, such as a parking bake or transmission in park, are engaged (step 208). If the automobile safety systems are not engaged, the PLC waits for an engagement communications signal (step 210) for some predetermined amount of time. In step 212, if an engagement communications signal is received within the allotted time period, the PLC locks the anti-theft system (step 214). In step 212, if an engagement communications signal is not received within the allotted time period, the PLC returns the anti-theft system back to step 202. In step 208, if the PLC determines that the automobile safety systems are engaged, the PLC locks the anti-theft system (step 214).

Once the PLC locks the anti-theft system (step 214), the anti-theft system waits for an unlock communications signal (step 216), such as from a monitoring service. In step 218, if the unlock communications signal is received, the PLC unlocks the anti-theft system and returns it back to step 202. If the unlock communications signal is not received, the PLC determines if there is power to the anti-theft system (step 220). If there is no power to the system, the PLC returns the anti-theft system back to step 210 where it remains locked. If there is power to the system, the PLC unlocks the anti-theft system and returns it back to step 202 once an unlock communications signal is received.

Returning to step 202, if the PLC initially determines the anti-theft system is in emergency operation, the PLC waits for a communications signal as previously described (step 205). Once an arm signal is received, the PLC arms the anti-theft system (step 207), which could also entail locking out all normal operation as previously described and sending a warning message to an L.C.D. panel or by audio transmission that the anti-theft system as been armed.

Once the anti-theft system is armed, the PLC determines if there is correct encoding (step 209). If there is not correct encoding, the PLC searches for the correct encoding for some predetermined amount of time. In step 212, if the correct encoding is not found within the allotted time period, the PLC returns the anti-theft system back to step 202. However, if the correct encoding is found within the allotted time period, the PLC locks the anti-theft system (step 213). Returning to step 209, if there is correct encoding, the PLC locks the anti-theft system (step 213).

Once the PLC locks the anti-theft system (step 213), the anti-theft system waits for a disarm communications signal (step 215). Once the disarm communications signal is received, the PLC determines if there is correct encoding (step 217). If there is correct encoding, the PLC unlocks the anti-theft system, turns off all message alert devices, and returns it back to step 202. If there is not correct encoding, the PLC searches for the correct encoding for some predetermined amount of time. In step 219, if the correct encoding is not found within the allotted time period, the PLC returns the anti-theft system back to step 213 where it remains locked. However, if the correct encoding is found within the allotted time period, the PLC unlocks the anti-theft system, turns off all message alert devices, and returns it back to step 202.

The embodiments and examples set forth herein were presented in order to best explain the invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, unless otherwise specified, any structures, systems, and components of the invention indicated in the drawings or described herein are given as an example of possible structures, systems, and components and not as limitations. Similarly, unless otherwise specified, any steps or sequence of steps of any operation method of the invention indicated herein are given as examples of possible steps or sequence of steps and not as limitations.

What is claimed is:

1. An automobile anti-theft device comprising:
a decoupling assembly comprising a first decoupling portion that couples to a throttle system and a second decoupling portion that couples to an accelerator system, the first decoupling portion and the second decoupling portion removably rotatingly coupled together, the first decoupling portion comprising a first decoupling disc having a locking pin aperture; and
a locking pin assembly configured to removably couple with the first decoupling portion, the locking pin assembly comprising a locking pin removably extendable into the locking pin aperture, such that when the locking pin is not extended into the locking pin aperture the accelerator system may operate the throttle system and when the locking pin is extended into the locking pin aperture the accelerator system is prevented from operating the throttle system.

2. The automobile anti-theft system of claim 1 further comprising an electro-mechanical actuator assembly associated to the locking pin assembly, the electro-mechanical actuator assembly configured to insert or remove the locking pin from the locking pin aperture.

3. The automobile anti-theft system of claim 2, wherein the electro-mechanical actuator assembly is one of a solenoid, a servo, and a screw motor.

4. The automobile anti-theft system of claim 1, wherein the decoupling assembly and the locking pin assembly are substantially disposed within a tamper-resistant housing.

5. The automobile anti-theft system of claim 4, wherein the tamper-resistant housing is mounted to one of an automobile firewall interior surface, a carburetor, a throttle body, a fuel injection system, and a diesel-type throttle pump.

6. The automobile anti-theft system of claim 1, wherein the first decoupling portion and the second decoupling portion are removably rotatingly coupled together in one of a ball/clutch configuration, a slip clutch configuration, a hydraulic or viscous coupling configuration, and a geared coupling configuration to allow the accelerator system to retain the ability to move even when the locking pin is extended into the locking pin aperture and the accelerator system is prevented from operating the throttle system.

7. The automobile anti-theft system of claim 6, wherein the first decoupling portion and the second decoupling portion are removably rotatingly coupled together in a ball/clutch configuration, wherein the first decoupling disc further comprises an alignment pin, at least one ball bearing, and at least one bearing recess, wherein the second decoupling portion comprises a second decoupling disc configured to removably couple with the first decoupling disc, the second decoupling disc comprising an alignment pin recess, at least one bearing recess, and a bearing track, wherein the alignment pin is configured to couple within the alignment pin recess and the at least one bearing is configured to both removably couple within each of the at least one bearing recesses and roll along the bearing track to facilitate rotation of the second decoupling portion when the locking pin is extended into the locking pin aperture.

8. The automobile anti-theft system of claim 1, wherein the locking pin assembly may further engage with the first decoupling portion when an automobile is moving.

9. The automobile anti-theft system of claim 8, wherein the locking pin assembly is spring-loaded and configured to actuate the locking pin assembly by extending the locking pin into a loaded position such that when the locking pin aperture rotates into alignment with the locking pin, the locking pin may spring into the locking pin aperture to prevent the accelerator system from operating the throttle system.

10. An automobile anti-theft device comprising:
a decoupling assembly comprising a first decoupling portion that couples to a throttle shaft and a second decoupling portion that couples to an accelerator shaft, the first decoupling portion and the second decoupling portion removably rotatingly coupled together about a central pivot axis, the first decoupling portion comprising a first decoupling disc having a locking pin aperture;

a locking pin assembly configured to removably couple with the first decoupling portion, the locking pin assembly comprising a locking pin removably extendable into the locking pin aperture, such that when the locking pin is not extended into the locking pin aperture rotational energy from the accelerator shaft causes the first decoupling portion and the second decoupling portion to rotate around the central pivot axis which transfers rotational energy to the throttle shaft to rev an automobile engine above idle, and when the locking pin is extended into the locking pin aperture rotational energy from the accelerator shaft does not cause the first decoupling portion to rotate around the central pivot axis and does not transfer rotational energy to the throttle shaft to rev the engine above idle; and an electro-mechanical actuator assembly associated to the locking pin assembly, the electro-mechanical actuator assembly configured to insert or remove the locking pin from the locking pin aperture.

11. The automobile anti-theft system of claim 10, wherein the electro-mechanical actuator assembly is one of a solenoid, a servo, and a screw motor.

12. The automobile anti-theft system of claim 10, wherein the decoupling assembly and the locking pin assembly are substantially disposed within a tamper-resistant housing.

13. The automobile anti-theft system of claim 12, wherein the tamper-resistant housing is mounted to one of an automobile firewall interior surface, a carburetor, a throttle body, a fuel injection system, and a diesel-type throttle pump.

14. The automobile anti-theft system of claim 10, wherein the first decoupling portion and the second decoupling portion are removably rotatingly coupled together in one of a ball/clutch configuration, a slip clutch configuration, a hydraulic or viscous coupling configuration, and a geared coupling configuration to allow the accelerator system to retain the ability to move even when the locking pin is extended into the locking pin aperture and the accelerator system is prevented from operating the throttle system.

15. The automobile anti-theft system of claim 14, wherein the first decoupling portion and the second decoupling portion are removably rotatingly coupled together in a ball/clutch configuration, wherein the first decoupling disc further comprises an alignment pin, at least one ball bearing, and at least one bearing recess, wherein the second decoupling portion comprises a second decoupling disc configured to removably couple with the first decoupling disc, the second decoupling disc comprising an alignment pin recess, at least one bearing recess, and a bearing track, wherein the alignment pin is configured to couple within the alignment pin recess and the at least one bearing is configured to both removably couple within each of the at least one bearing recesses and roll along the bearing track to facilitate rotation of the second decoupling portion when the locking pin is extended into the locking pin aperture.

16. The automobile anti-theft system of claim 10, wherein the locking pin assembly may further engage with the first decoupling portion when an automobile is moving.

17. The automobile anti-theft system of claim 16, wherein the locking pin assembly is spring-loaded and configured to actuate the locking pin assembly by extending the locking pin into a loaded position such that when the locking pin aperture rotates into alignment with the locking pin, the locking pin may spring into the locking pin aperture to prevent the accelerator system from operating the throttle system.

18. An automobile anti-theft device comprising:
a decoupling assembly comprising a first decoupling portion that couples to an electrically impulse controlled drive-by-wire throttle system, and a second decoupling portion that couples to an accelerator shaft, the first decoupling portion and the second decoupling portion removably rotatingly coupled together, the first decoupling portion comprising a first decoupling disc having a locking pin aperture; and a locking pin assembly configured to removably couple with the first decoupling portion, the locking pin assembly comprising a locking pin removably extendable into the locking pin aperture, such that when the locking pin is not extended into the locking pin aperture the accelerator system may operate the throttle system and when the locking pin is extended into the locking pin aperture the accelerator system is prevented from operating the throttle system.

19. The automobile anti-theft system of claim 18 further comprising an electro-mechanical actuator assembly associated to the locking pin assembly, the electro-mechanical actuator assembly configured to insert or remove the locking pin from the locking pin aperture, wherein the electro-mechanical actuator assembly is one of a solenoid, a servo, and a screw motor.

* * * * *